Oct. 29, 1968  A. P. KELLEY ET AL  3,407,603
REACTION PROPULSION ENGINES
Filed July 27, 1961  3 Sheets-Sheet 2
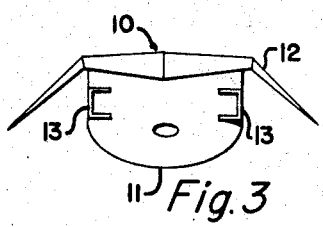
Fig. 3
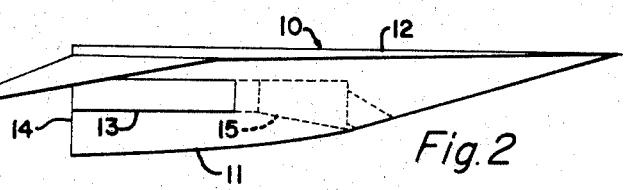
Fig. 2
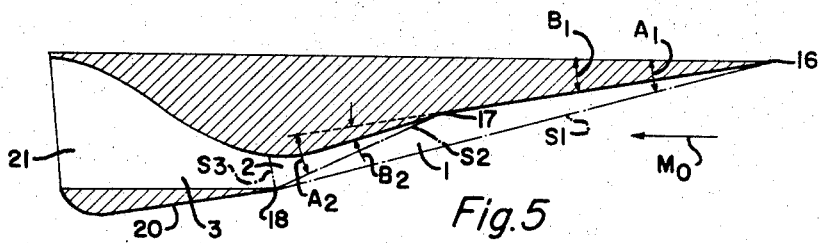
Fig. 5
Fig. 6
| $M_0$ | $B_1$ | $A_1$ | $B_2$ | $A_2$ |
|---|---|---|---|---|
| 4 | — | — | — | 90° |
| 10 | 17°-26' | 22°-24' | 22°-30' | 35° |
| 15 | 11°-23' | 14°-30' | 6°-45' | 18° |
| 20 | 8°-41' | 11° | 13°-50' | 18° |
| 25 | 6°-40' | 8°-30 | 15°-13' | 18° |
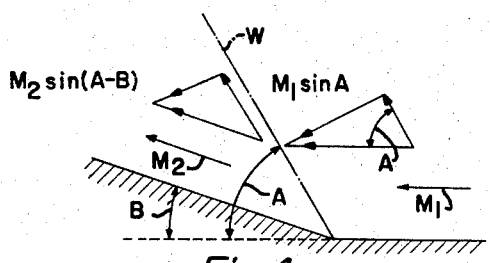
Fig. 4
INVENTORS
ARCHIBALD P. KELLEY
LESLIE W. NORMAN
BY
ATTORNEY Oct. 29, 1968    A. P. KELLEY ET AL    3,407,603
REACTION PROPULSION ENGINES
Filed July 27, 1961    3 Sheets-Sheet 3
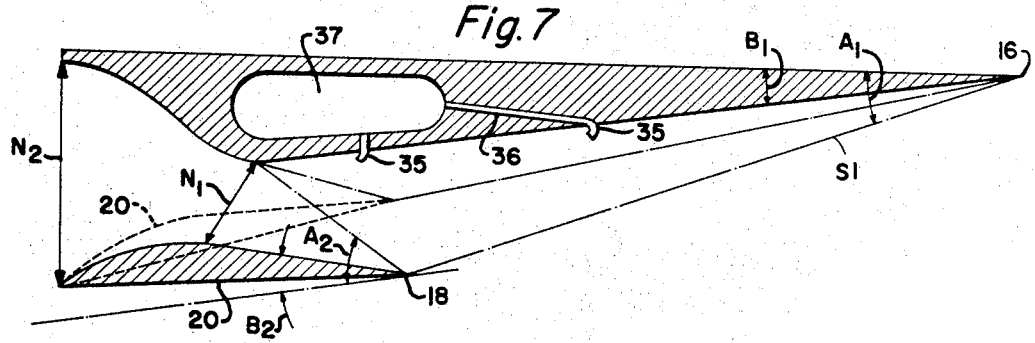
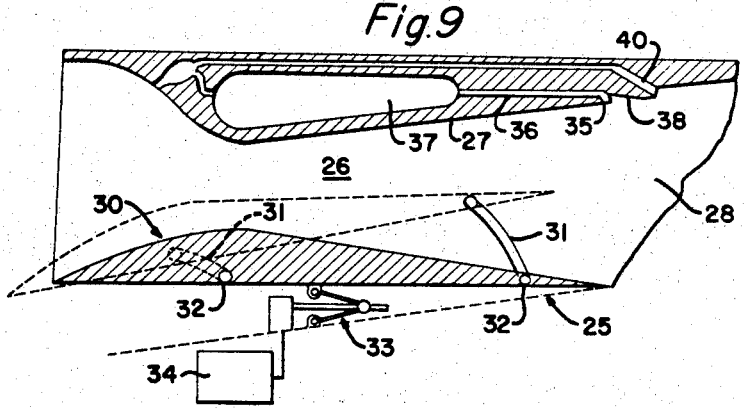
Fig.8
| $M_1$ | $B_1$ | $A_1$ | $B_2$ | $A_2$ | $\dfrac{N_2}{N_1}$ |
|---|---|---|---|---|---|
| 10 | 6°-30' | 11° | 20°-17' | 35° | 25 |
| 15 | 6°-30' | 9°-20' | 15°-22' | 25° | 50 |
| 25 | 6°-30' | 8°-30' | 14°-4' | 18° | 175 |
INVENTORS
ARCHIBALD P. KELLEY
LESLIE W. NORMAN
BY
*Francis D. Betee*
ATTORNEY United States Patent Office
3,407,603
Patented Oct. 29, 1968

3,407,603
REACTION PROPULSION ENGINES
Archibald P. Kelley and Leslie W. Norman, Scottsdale, Ariz., assignors to The Garrett Corporation, Los Angeles, Calif., a corporation of California
Filed July 27, 1961, Ser. No. 127,369
14 Claims. (Cl. 60—204)

This invention relates generally to hypersonic aircraft and is particularly directed to an air-breathing detonation combustion engine for such an aircraft which is adapted to operate over a wide range of hypersonic speeds, especially in the range from Mach 4 to Mach 25.

Consideration has been given recently to an air-breathing detonation combustion engine particularly designed for cruising at an altitude of 125,000 feet and a substantially constant speed of about Mach 6.5. In a variable geometry engine for this purpose, the flame front or detonation is established by the temperature rise occurring across a normal wave, rather than by conventional combustion processes such as occur in ramjet and turbojet engines. Steady state detonation is established and maintained across a standing normal wave of fixed position relative to a confining structure therefor, and subsequent expansion of the gaseous detonation product is used to develop a continuous thrust. At a flight Mach number of the order of 6 to 7, the normal wave engine makes its nearest approach to the ideal engine. At higher flight Mach numbers, performance rapidly deteriorates due to effects of dissociation and low inlet kinetic efficiencies resulting from the total pressure losses across the normal wave. Practical limits of the normal wave engine would probably occur at flight Mach numbers lower than those where aerothermodynamic performance deteriorates.

The present invention is based on the discovery that operating conditions in a detonation combustion engine may be adjusted so that detonation will take place across an oblique wave rather than a normal wave, and that by varying the angle of obliquity of the wave it is possible to effect detonation combustion at Mach numbers of from 4 to 25. In addition, the invention depends for its operation on the further discovery of a suitable method and means for varying the internal geometry of the engine in accordance with the desired variance of the obliquity of the detonation wave. It has also been found that such variation of the internal geometry of the engine provides a predetermined relationship between the cross-sectional area of the combustion zone and that of the exit nozzle, with the latter remaining substantially constant and the former decreasing as the free stream Mach number increases.

It is therefore an object of this invention to provide a variable geometry detonation combustion engine for an aircraft which is not subject to the limitations of a normal wave engine and is adapted to operate over a wide range of hypersonic speeds.

Another object of the invention is to provide a detonation combustion engine in which detonation takes place across an oblique wave.

Another object of the invention is to provide a variable geometry detonation combustion engine in which detonation takes place across an oblique wave and in which means are provided for varying the angle of obliquity of said wave.

A further object of the invention is to provide a variable geometry detonation combustion engine which includes an aerothermodynamic duct having means for varying the angle of obliquity of the detonation combustion wave and a predetermined relationship between the cross-sectional area of the combustion zone and that of the exhaust nozzle.

It is a still further object of the invention to provide a variable geometry detonation combustion engine which is constructed and arranged to produce a minimum of two oblique waves, the last of which will elevate the static air temperature and alter other thermodynamic conditions to the degree required for detonation combustion of a suitable fuel-air mixture.

The above and other features and objects of the invention will be apparent from the following more detailed description and the accompanying drawings, in which:

FIGS. 2 and 3 are side and front schematic elevational views, respectively, of the aircraft shown in FIG. 1;

FIG. 4 is a vector diagram showing the relationship between a normal wave and an oblique wave;

FIG. 5 is a schematic view of one form of variable geometry for an engine constructed in accordance with this invention;

FIG. 6 is a chart showing the angular relationships of the variable geometry engine of FIG. 5;

FIG. 7 is a schematic view of a variable geometry engine in which the fuselage angle is made constant;

FIG. 8 is a chart showing the various angular and area relationships for the FIG. 7 engine; and FIG. 9 is a fragmentary schematic view of the FIG. 7 engine showing further details of the movable wall and fuel injection means.

Figure 1:
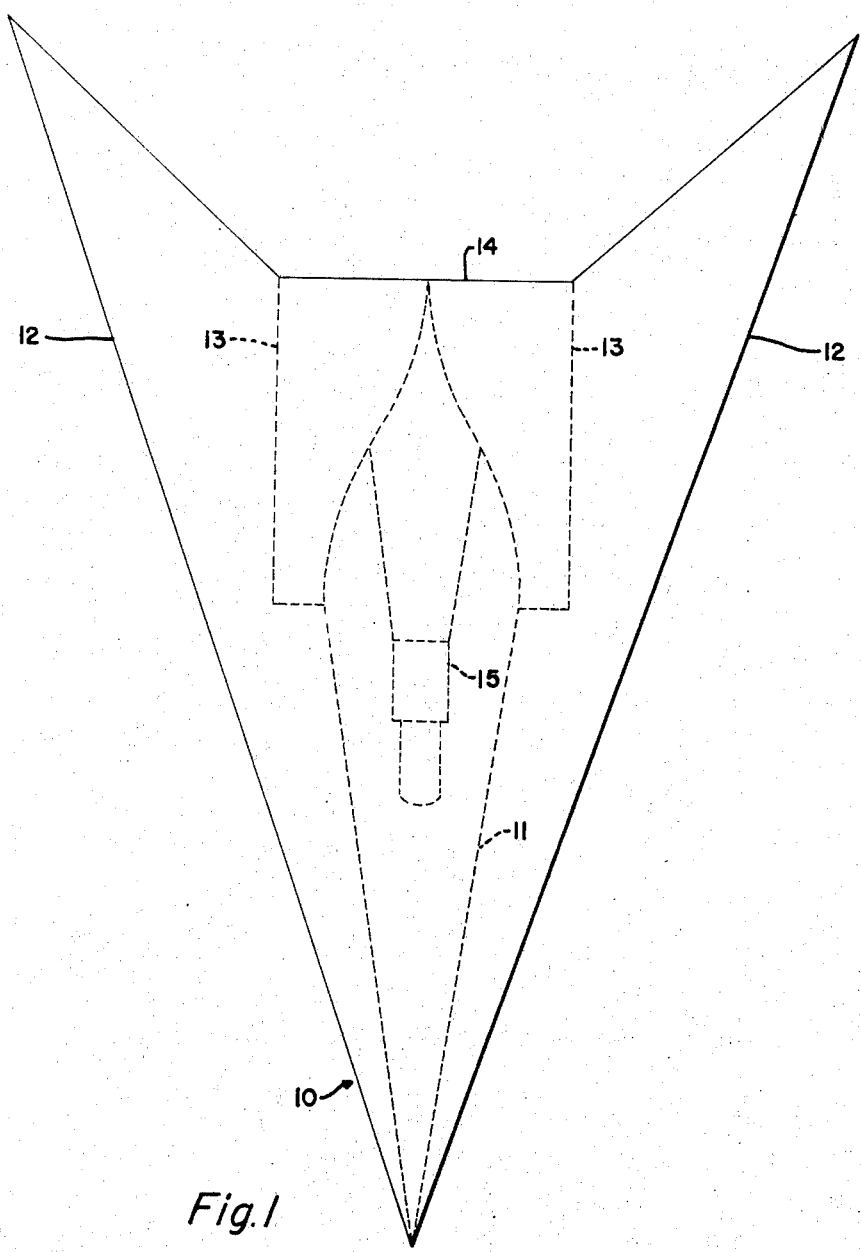
FIG. 1 is a schematic plan view of a hypersonic aircraft having detonation combustion engines embodying the principles of this invention.

As used herein, a "detonation" may be defined as a wave in which an exothermic chemical reaction takes place and which moves with supersonic velocity with respect to the undetonated reactant gas. Detonation is characterized by this supersonic propagation velocity and a large static pressure and temperature increase across the wave. A detonation differs from a subsonic flame in that such a flame moves with subsonic velocity and its microscopic propagation mechanisms are fundamentally different. The supersonic combustion wave produces strong detonation which is stable, steady, reproducible, and obtainable over a wide fuel-air ratio, as long as the Mach number of the approach flow is greater than the Chapman-Jouquet Mach number for that fuel-air ratio. A "Chapman-Jouquet" detonation is characterized by the fact that the flow immediately behind the wave is sonic, i.e., a Mach number of one, and such a detonation represents the minimum supersonic propagation Mach number for a given fuel-air ratio. Experiment has shown that detonation combustion takes place under the following conditions:

(1) A stream of gases is moving supersonically relative to the containment vessel or aerothermodynamic duct.

(2) The total temperature of the supersonic gas stream must exceed the detonation temperature of the gas stream.

(3) The gas stream consists of a mixture of some oxidizer, such as air, and unburned fuel, such as hydrogen.

(4) A shock system of such strength is generated at some point in the aerothermodynamic duct that the static temperature across the shock system is high enough to cause detonation.

As mentioned above, these principles have already been applied to a variable geometry detonation combustion engine designed particularly for cruising at a substantially constant Mach number of 6.5 by means of the propulsive force produced from detonation of a fuel-air mixture across a normal wave. Stable and continuous detonation is established and maintained across the standing normal wave which is in a fixed position relative to the confining structure therefor, and subsequent expansion of the gaseous detonation products is used to develop a continuous thrust. According to the present invention, crusing may take place at varying Mach numbers from 4 to 25 by means of the propulsive force produced from detonation across an oblique wave in an aerothermodynamic duct which includes means for varying the angle of obliquity of said wave to accommodate the system to changes in Mach number, as will now be described.

Referring to the drawings, and particularly FIGS. 1, 2 and 3, a hypersonic aircraft 10 comprises a fuselage 11, wing portions 12, and a pair of symmetrically disposed engines 13 embodying the principles of this invention. The wing and fuselage are shaped to provide a base 14 for the reception of suitable rocket propulsion means (not shown) which may be used to accelerate the aircraft 10 to a predetermined hypersonic speed, for example, Mach 7. At such speed, the engines 13 would take over for the cruising portion of the flight which is contemplated to be capable of ranging from Mach 4 to Mach 25, depending upon the altitude, so that effective cooling may always be accomplished. Upon termination of the cruising portion of the flight, the aircraft may be brought in for landing by any suitable engine 15, such as a conventional turbojet, which could be mounted in the air-frame or fuselage forward of the engines 13 but in a position to utilize the exhaust nozzles thereof.

It is understood by those skilled in the art that normal shocks are special forms of pressure discontinuities within a fluid where the wave is normal to the direction of fluid flow. (See "The Dynamics and Thermodynamics of Compressible Fluid Flow," vol. I, by A. H. Shapiro.) Discontinuities which are inclined to the direction of the oncoming flow are called "oblique shocks" and they tend to occur readily in super- and hypersonic flow, and always occur and are attached to the surface of a body when the stream is forced to change direction, as in a concave corner. Such a concave corner is shown in the FIG. 4 vector diagram where the relationship of the velocity components of an oblique wave and its related normal wave are illustrated. It will be noted that an oblique wave W having an approach Mach number $M_1$ may, by the indicated transformation of the coordinate system, be reduced to a normal shock with an approach number $M_1 \sin A$. Similarly, to the down-stream Mach number $M_2$ may be reduced to $M_2 \sin (A-B)$. The thermodynamic relationships for the normal adiabatic waves will also be applicable, as explained by Shapiro, and the equation for the temperature ratios of such an oblique wave W is:

$$\frac{T_2}{T_1} = \frac{\left(1 + \frac{r-1}{2} M_1^2 \sin^2 A\right)\left(\frac{2r}{r-1} M_1 \sin^2 A - 1\right)}{\frac{(r+1)^2}{2(r-1)} M_1^2 \sin^2 A}$$

where:

$T_1$ = Absolute static temperature before wave (° R.)
$T_2$ = Absolute static temperature after wave (° R.)
$M_1$ = Approach Mach number before the oblique wave
$A$ = Angle of shock to incoming flow
$r$ = Ratio of specific heats In the design of a hypersonic detonation combustion engine incorporating these principles and utilizing an oblique shock for one boundary of the combustion zone, it has been found that a series of physical ramps may be used to create the oblique shocks and establish static temperatures sufficiently high for detonation combustion to take place in a predetermined combustion zone. As shown in FIG. 5, the multiple ramp arrangement is such that the free air-stream striking a ramp or leading edge 16 of the aircraft causes a shock wave $S_1$ to be created. Another leading edge or wedge 17 generates a second wave $S_2$, both the waves $S_1$ and $S_2$ extending, from the edges creating said waves, to a leading edge 18 of a movable ramp 20. This leading edge 18 also acts to generate a third oblique shock wave $S_3$ which extends from said leading edge 18 to the fuselage surface immediately upstream of the exhaust nozzle, as shown. The combination of the three oblique shock waves creates zones 1, 2 and 3 where the static temperature and pressure conditions, and hence the zone where detonation combustion will be excited, are dependent upon the velocity or Mach number of the aircraft and free airstream, as will now be explained.

When the free stream Mach number is below $M_8$ and in the range from $M_4$ to $M_7$, the range of temperature $T_1$ in zone 1 will be somewhat below 1750° R., and even in zone 2 will probably not go above 1750° R. Thus, if fuel is added in zone 2, there should be no preignition, and detonation combustion will not take place until excited by oblique wave $S_3$. This wave should raise the static temperature to the 4,000–5,000° R. range in the upstream end of zone 3, so that there will be maximum efficiency and thrust when the temperature of the fuel-air mixture is raised to this range when detonation combustion takes place.

If the velocity of the aircraft is above $M_8$ and in the range of $M_8$ to $M_{25}$, the temperature $T_1$ in zone 1 will approach 1750° R., and oblique shock wave $S_2$ will further increase the static temperature in zone 2. In fact, for these higher Mach numbers, the static temperature will be raised sufficiently that the combustion zone will move upstream from that described above and detonation may be excited within zone 2 when fuel is properly injected.

Since it is the purpose of this invention to operate the engine efficiently at varying Mach numbers from $M_4$ to $M_{25}$, it is important to generate temperatures well above 1750° R. in zone 2 for the high Mach numbers (from $M_{-8}$ to $M_{-25}$) and in zone 3 for Mach numbers $M_4$ to $M_7$. Below 1750° R., detonation of a mixture of fuel and air is improbable with the dwell times that would prevail in the precombustor section, it obviously being important to avoid or prevent preignition in the far upstream areas. In order to raise the static temperature well above 1750° R. so that combustion will take place in the zone desired (depending upon the free stream Mach number, as explained above), the ramp angles and relationships creating waves $S_1$, $S_2$ and $S_3$ may be adjusted and varied as indicated in the chart of FIG. 6. Here the angles for $B_1$, $A_1$ and $B_2$, $A_2$ are shown for free stream Mach numbers $M_4$ to $M_{25}$.

It will be understood that, depending upon the free stream Mach number, a minimum of two oblique shock waves are required for practicing this invention. The use of more than one wave to increase the static temperature to the 1750° R. point may be desirable to increase the inlet kinetic efficiency while minimizing the total pressure losses across the wave. Thus, the engine geometry is a function of the free stream Mach number and the desired internal air static conditions; and means for varying the geometry are required to provide the necessary angular relationships in the air path to accommodate a wide variety of free stream Mach numbers. The angles shown in the FIG. 6 chart indicate an appropriate configuration of the duct angles shown in FIG. 5 for each flight Mach number. It has been found, however, that at Mach 4, the wave can be normal for many different angular relationships.

From a practical point of view, it may be desirable to fix the angle of $B_1$ and then vary the remaining angles $B_2$ and $A_2$ by moving the ramp 20 to effect the desired changes in static temperature. Such a more practical arrangement is shown schematically in FIG. 7 and the angular relationships for different Mach numbers are shown in the chart of FIG. 8. In addition to maintaining the proper angular relationships as indicated, it has been found that the ratio of the cross-sectional area of the nozzle $N_2$ to the cross-sectional area $N_1$ at the combustion zone for the various Mach numbers is important. This is also shown in the FIG. 8 chart.

Examination of FIG. 7 and the relationships enumerated in the FIG. 8 chart indicate clearly that the movable ramp 20 is a most important part of this invention. The FIG. 7 diagram is actually a plan view or horizontal section through one of the engines 13 shown in FIG. 1. Said ramp 20, therefore, may be a movable side wall of the engine and the cooperating wall forming angle $B_1$ is a part or wall of the fuselage 11. Any suitable means may be employed to effect the desired movements of the ramp 20, such as shown in FIG. 9, where a portion of an engine 25 is illustrated schematically. The engine 25 consists of a variable geometry duct 26 which is formed by a fuselage wall 27, a lower wall or floor 28, and a movable side wall or ramp 30. The duct obviously would also include a top wall which is not shown in the schematic view. One or more cam grooves 31 may be formed in the floor 28 for engagement by rollers 32 to guide the movement of the ramp 30 from the full line to the dash line position of FIG. 9. Such movement may be accomplished by suitable mechanically or pneumatically operated linkages 33, which in turn are properly actuated by a control mechanism 34. This control mechanism may be operated automatically or by the pilot of the aircraft and includes speed sensors and associated electronic devices (not shown) so that the movement of the ramp 30 may be made in response to changes in the speed or Mach number of the aircraft. Such movement is required to maintain the relationships set forth in the FIG. 8 chart and assure the positioning of the leading edge of ramp 30 always on the shock wave $S_1$.

Injection and control of the fuel supply are also important aspects of the operation of the detonation combustion engine embodying the principles of this invention. One or more fuel injection jets or nozzles 35 may be connected by a conduit 36 to a fuel tank 37 located in the fuselage 11 of the aircraft, as indicated in both FIGS. 7 and 9, and these jets are arranged to inject the fuel into the mixing or precombustor zone immediately upstream of the combustion zone. As mentioned above, the static temperature in this zone is about 1700° R., which is lower than the probable detonation combustion temperature of hydrogen and air. Although hydrogen makes an ideal fuel for use in the conditions under consideration, it will be understood that other gaseous fuels, such as the hydrocarbons, methane, propane, and butane, would also be suitable, but the combustion conditions would be somewhat different for such fuels.

In order to obtain both proper injection of fuel and adequate mixing with the hypersonic airstream, it has been found desirable to provide an expansion surface 38 slightly upstream from the fuel injection jet 35 in FIG. 9. To remove the boundary layer ahead of the fuel injection point, a suction passage 40 may be provided upstream or prior to the expansion surface 38; and such boundary layer air may be fed through the passage, burned with the addition of fuel and fed into the exhaust nozzle. The expansion surface 38 is designed to turn the air flow slightly and thereby cause a small increase in the Mach number. Injection of the fuel is then arranged to take place at an increased angle, which creates a compression wave, and if this angle is small, adequate penetration of the fuel will take place with a minimum of losses.

We claim:

1. A method of operating an aerothermodynamic duct at free streams Mach numbers between 4 and 25 which comprises: inducing a flow of air into said duct; exciting an oblique shock wave in a combustion region downstream in said duct; mixing fuel with said induced air upstream of said combustion region, the shock wave serving to increase the temperature of the fuel-air mixture to cause detonation thereof; maintaining the location of said oblique shock wave in said duct at different free stream Mach numbers through the adjustment of the angle of obliquity of such shock wave in accordance with the changes in the free stream Mach number; and expanding the heated products of such detonation rearwardly of said duct for imparting forward thrust thereto.

2. A method of operating an aerothermodynamic duct at free streams Mach numbers between 4 and 25 which comprises: inducing a flow of air into said duct; exciting an oblique shock wave in a combustion region downstream in said duct; mixing fuel with said induced air upstream of said combustion region, the shock wave serving to increase the temperature of the fuel-air mixture to cause detonation thereof; maintaining the location of said oblique shock wave in said duct at different free stream Mach numbers through the adjustment of the angle of obliquity of said shock wave in accordance with changes in the free stream Mach number, such adjustment consisting of reducing the angle of obliquity as the free stream Mach number increases; and expanding the heated products of such detonation rearwardly of said duct for imparting forward thrust thereto.

3. A method of operating an aerothermodynamic duct at free streams Mach numbers between 4 and 25 which comprises: inducing the flow of air into said duct; exciting an oblique shock wave in a combustion region downstream in said duct; mixing fuel with said induced air upstream of said combustion region, the shock wave serving to increase the temperature of the fuel-air mixture to cause detonation thereof; reducing the angle of obliquity of said shock wave and also reducing the cross-sectional area of the combustion zone as the free stream Mach number increases; and expanding the heated products of such detonation rearwardly of said duct for imparting forward thrust thereto.

4. A method of operating an aerothermodynamic duct at free streams Mach numbers between 4 and 25 which comprises: inducing the flow of air into said duct; exciting first and second oblique shock waves in said duct so as to create mixing and combustion zones; mixing fuel with said induced air in said mixing zone; adjusting the angle of obliquity of said first shock wave with respect to dwell time to maintain the static temperature below the ignition temperature of the fuel-air mixture so as to prevent combustion in said mixing zone, the angle of obliquity of said second oblique wave being such as to cause a temperature rise across said wave so that detonation of the fuel-air mixture will take place at said second wave; maintaining the position of said second shock wave in said duct through the adjustment of the angle of obliquity thereof in accordance with changes in the free stream Mach number, such adjustments including reducing said angle of obliquity while increasing the ratio of the cross-sectional area of the exhaust nozzle to the cross-sectional area of the zone of detonation and combustion as said free stream Mach number increases; and expanding the heated products of such detonation rearwardly of said duct for imparting forward thrust thereto.

5. In combination with a vehicle for travel through air at a Mach number between 4 and 25, a reaction propulsion engine comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one wave downstream of said inlet at which the temperature will be increased sufficiently to detonate the fuel-air mixture; and means for varying the angle of obliquity of said downstream wave in accordance with changes in the rate of travel of said vehicle.

6. In combination with a vehicle for travel through air at a Mach number between 4 and 25, a reaction propulsion engine comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said downstream wave in accordance with changes in the rate of travel of said vehicle, said last-mentioned means including means for reducing the cross-sectional area of the inlet opening as the rate of travel of said vehicle increases.

7. In combination with a vehicle for travel through air at a Mach number between 4 and 25, a reaction propulsion engine comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said downstream wave in accordance with changes in the rate of travel of said vehicle, said last-mentioned means comprising a movable wall and means for moving said wall to reduce the cross-sectional area of the zone where such detonation takes place as the rate of travel of said vehicle increases.

8. In combination with a vehicle for travel through air at a Mach number between 4 and 25, a reaction propulsion engine comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said downstream wave in accordance with changes in the rate of travel of said vehicle, said last-mentioned means comprising a movable wall extending from said inlet opening to said rearwardly directed opening.

9. In combination with a vehicle for travel through air at a Mach number between 4 and 25, a reaction propulsion engine comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said downstream wave in accordance with changes in the rate of travel of said vehicle, said last-mentioned means comprising a movable wall extending from said inlet opening to said rearwardly directed opening and means for moving said wall so as to change the size of the inlet opening while maintaining the size of said rearwardly directed opening substantially constant.

10. A reaction propulsion engine for aircraft designed for operation at speeds varying from Mach 4 to Mach 25 comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means upstream of said injector means for removing any boundary layer that may be formed upstream of said injector means; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said wave in accordance with changes in the rate of travel of said aircraft.

11. A reaction propulsion engine for aircraft designed for operation at speeds varying from Mach 4 to Mach 25 comprising: a duct for confining a flow of air, said duct including a forwardly directed inlet opening for inducing said flow and a rearwardly directed opening for expelling said flow; injector means in said duct adjacent said inlet opening to introduce fuel into said flow for mixture therewith; means for creating a plurality of oblique shock waves as the air flows toward and into said duct including one oblique wave downstream of said inlet at which the temperature will be increased sufficiently to detonate the fuel-air mixture; and means for maintaining the position of said detonation wave in said duct by varying the angle of obliquity of said downstream wave in accordance with changes in the rate of travel of said aircraft, said last-mentioned means comprising a movable wall extending from said inlet opening to said rearwardly directed opening and means for moving said wall so as to change the size of the inlet opening while maintaining the size of said rearwardly directed opening substantially constant.

12. A reaction propulsion engine for aircraft designed for operation at speeds varying from Mach 4 to Mach 25 comprising: an aerothermodynamic duct for confining a flow of air, said duct including a forwardly directed inlet opening and a rearwardly directed opening for expelling said flow; injector means for introducing fuel into said flow for mixture therewith; means for creating an oblique wave downstream of said inlet at which the temperature will be increased sufficiently to detonate the fuel-air mixture; and means for maintaining the position of said detonation wave in said duct by varying the angle of obliquity of said wave in accordance with changes in the rate of travel of the aircraft, said last-mentioned means comprising a movable wall forming part of said aerothermodynamic duct and extending from said inlet to said rearwardly directed opening.

13. A reaction propulsion engine for aircraft designed for operation at speeds varying from Mach 4 to Mach 25, comprising: means forming a duct having a forwardly directed inlet opening for receiving air and a rearwardly directed opening for expelling such air, said means having a leading edge at one side of said inlet opening which creates a first oblique shock wave on air entering said inlet opening; a second means downstream of said leading edge for creating a second oblique shock wave on such entering air; a third means disposed for engagement by said second oblique shock wave and operative to create a third oblique shock wave; a fourth means for introducing fuel to the entering air between the first and third means, said third shock wave increasing the temperature of said air and fuel mixture sufficiently to cause detonation thereof, the heated products of detonation expanding through said rearwardly directed opening; and a fifth means for adjusting said third means to dispose the same in position for engagement by said second shock wave at different speeds of said aircraft.

14. A reaction propulsion engine for aircraft designed for operation at speeds varying from Mach 4 to Mach 25, comprising: means forming a duct having a forwardly directed inlet opening for receiving air and a rearwardly directed outlet opening for expelling such air, such duct having a combustion zone between said inlet and outlet openings and a first leading edge which creates a first oblique shock wave on the air stream entering said inlet opening; a second leading edge on said duct downstream from said first leading edge; means between said first and second leading edges for introducing fuel to the air stream, and second leading edge engaging the first oblique shock wave and creating another oblique shock wave at which the temperature of the air and fuel mixture will be increased sufficiently to cause detonation thereof in said combustion zone, the heated products of detonation expanding through said rearwardly directed outlet opening; and means for adjusting said second leading edge to substantially maintain the position of the oblique shock wave created thereby relative to said combustion zone.

References Cited

UNITED STATES PATENTS

| | | | |
|---|---|---|---|
| 2,540,594 | 2/1951 | Price | 60—35.6 |
| 2,692,480 | 10/1954 | Viaud et al. | 60—39.72 |
| 3,040,516 | 6/1959 | Brees | 60—35.6 |

OTHER REFERENCES

"Recent Advances in Ramjet Combustion," by Gordon L. Dugger, published in ARS Journal, November 1959, pp. 819–827.

"A Preliminary Study of the Application of Steady State Detonative Combustion to a Reaction Engine," by Dunlap, Brehm and Nicholls, published in Jet Propulsion July 1958, pp. 451–456.

MARTIN P. SCHWADRON, *Primary Examiner.*

D. HART, *Assistant Examiner.*